US005655996A

United States Patent [19]

Ohtsuka

[11] Patent Number: 5,655,996
[45] Date of Patent: Aug. 12, 1997

[54] CLUTCH CONTROL METHOD AND DEVICE FOR VEHICLE WITH AUTOMATIC TRANSMISSION

[75] Inventor: Toshio Ohtsuka, Hyogo, Japan

[73] Assignee: Mitsubishi Denki Kabushiki Kaisha, Tokyo, Japan

[21] Appl. No.: 564,583

[22] Filed: Nov. 29, 1995

[30] Foreign Application Priority Data

May 25, 1995 [JP] Japan .................. 7-152666

[51] Int. Cl.⁶ .................................. B60K 41/02
[52] U.S. Cl. ................... 477/166; 477/175; 477/181
[58] Field of Search .................... 477/166, 174, 477/175, 181

[56] References Cited

U.S. PATENT DOCUMENTS

| 4,484,497 | 11/1984 | Hibino | 477/181 X |
|---|---|---|---|
| 4,515,257 | 5/1985 | Takano et al. | 192/0.075 |
| 4,580,464 | 4/1986 | Nishikawa et al. | 477/175 X |
| 5,086,894 | 2/1992 | Iisuka et al. | 477/174 X |
| 5,190,130 | 3/1993 | Thomas et al. | 477/174 X |
| 5,207,198 | 5/1993 | Eisele | 477/175 X |
| 5,425,687 | 6/1995 | Taga et al. | 477/174 X |
| 5,460,584 | 10/1995 | Kusaka et al. | 477/174 X |
| 5,484,354 | 1/1996 | Vukovich et al. | 477/174 |
| 5,489,012 | 2/1996 | Buckley et al. | 477/175 X |
| 5,490,815 | 2/1996 | Kato et al. | 477/181 |

FOREIGN PATENT DOCUMENTS 1-119433  5/1989  Japan .

*Primary Examiner*—Rodney H. Bonck
*Assistant Examiner*—Peter T. Kwon
*Attorney, Agent, or Firm*—Sughrue, Mion, Zinn, Macpeak & Seas

[57] ABSTRACT

In the fuel cut state during deceleration, an actual vehicle speed Vs is compared with a target vehicle speed Vso when the direct coupling state is changed into a semi-coupling state, or otherwise an actual engine rotational speed Ne is compared with a return engine rotational speed Neo at the return from fuel cut. Then, if $Vs \leq Vso$ or $Ne \leq Neo+K$ (K is a positive predetermined value), the clutch is changed from the direct coupling state into the semi-coupling state. Thus, shock due to torque change at the time of return from fuel cut can be reduced, and during the coast down, the fuel cut state can be maintained until the low rotational speed is attained. Both improvement of fuel economy and efficient use of engine brake can be attained. Engine stall can be prevented at the time of abrupt braking.

6 Claims, 6 Drawing Sheets

CLUTCH CONTROL METHOD AND DEVICE FOR VEHICLE WITH AUTOMATIC TRANSMISSION

BACKGROUND OF THE INVENTION

1. Field of the Invention

The present invention relates to a clutch control device for a vehicle with an automatic transmission, and more particularly to a technique for relieving shock when return from fuel cut is attained regardless of a transmission schedule while improving the effect of engine brake due to fuel cut during coast-down or braking under the state with a high transmission ratio (transmission ratio≧1), and preventing engine stall.

2. Description of the Prior Art

A CVT (continuously variable transmission) mounted on a vehicle has been proposed in Unexamined Japanese Patent Publication 1-119433 (1989). The vehicle equipped with such a CVT compares a vehicle speed Vs with a target vehicle speed Vso during coast down or braking, and when Vs≦Vso, changes the clutch from the direct coupling state into the incomplete clutch or semi-coupling state. In this case, the target vehicle speed Vso is set at a predetermined value (e.g. 25 km/h).

The means for automatically performing such a clutch function includes a lock-up clutch controlled by an automatic control device, a hydraulic single-plate clutch, or the like.

In the above clutch control device for a vehicle equipped with an automatic transmission, a change from the direct coupling state into the semi-coupling clutch state is decided by a predetermined value in terms of the vehicle speed of Vs. For this reason, depending on some transmission schedules, when return from fuel cut occurs in the direct coupling state of a clutch during coast down or braking, engine brake force is reduced. A change in the driving torque when the return from fuel cut occurs is directly passed to the vehicle, thus producing shock disadvantageously. Particularly, when the transmission ratio is as high as 1 or more because of a certain transmission schedule, great shock due to return from fuel cut occurs.

In abrupt braking (e.g. braking on a low μ passageway), the shift to the semi-coupling state is delayed, thereby producing engine stall disadvantageously.

SUMMARY OF THE INVENTION

The present invention has been completed in order to solve the above problem. An object of the present invention is to provide a clutch control device for a vehicle equipped with an automatic transmission which can relieve shock due to torque changes at the time of return from fuel cut and prevent engine stall. The above relief of shock can be realized by a hydraulic clutch from the direct coupling to semi coupling clutch state before return from fuel cut. The engine stall can be prevented by effectively using the engine brake to a low vehicle speed during coast down and swiftly falling the clutch into the semi-coupling clutch state in abrupt braking.

In order to attain the above object, this invention is characterized in that before fuel jet is started again from a fuel cut state during deceleration, the clutch is changed from a direct coupling state to a semi-coupling state. Now, the "fuel cut state during deceleration" means the state where fuel cut is performed in a deceleration state requiring no fuel supply when the engine rotational speed in throttle complete closing is not lower than a predetermined rotational speed.

More specifically, in the fuel cut state during deceleration, an actual vehicle speed Vs is compared with a target vehicle speed Vso when the direct coupling state is changed into a semi-coupling state, or otherwise an actual engine rotational speed Ne is compared with an engine rotational speed Neo at the return from fuel cut. Then, if Vs≦Vso or Ne≦Neo+K (K is a positive predetermined value), the clutch is changed from the direct coupling state to the semi-coupling state.

If Vs≦Vso or Ne≦Neo+ΔNeo+K (ΔNeo denotes a correction coefficient, and K is a positive predetermined value), the clutch is changed from the direct coupling state into the semi-coupling state. The decision engine speed correction coefficient ΔNeo where the clutch is changed from the direct coupling state into the semi coupling state is changed by the changing rate dVs/dt of an actual vehicle speed and the changing rate dNe/dt of an actual engine rotational speed.

In the present invention, before the return from fuel cut when fuel jet is started again from the fuel cut state during deceleration, the clutch is changed from the direct coupling state into the semi-coupling state, thus reducing clutch transmission torque so that shock due to the return from fuel cut is absorbed.

More specifically, in the fuel cut state during deceleration (during coast-down or braking), even with the actual engine rotational speed Ne>Neo (engine rotational speed at return from fuel cut)+K (positive predetermined value), when the actual vehicle speed Vs≦Vso (target vehicle speed), the clutch will be changed from the lock-up clutch state into the semi-coupling state. The engine brake, therefore, can be effectively used. Further, since the return from fuel cut occurs after the clutch falls into the semi-coupling state, shock due to the torque change at the return can be also relieved.

On the other hand, if Vs>Vso and Ne≦Neo+K, then at Ne=Neo+K, the clutch will be changed from the coupling state into semi-coupling state. For this reason, at Ne=Neo, the return from fuel cut occurs after the clutch falls into the semi-coupling state. The shock due to torque change at the return can be also relieved irrespectively of the transmission schedule.

With the engine rotational speed correction coefficient ΔNeo for deciding the shift from the direct coupling state to the semi-coupling state in accordance with the value of dVs/dt or dNe/dt being set at a high value, for example, in abrupt braking, if the clutch is caused to fall into the semi-coupling state, the engine stall can be prevented. Further, during coast-down, the clutch can be maintained in the direct coupling state so that the engine brake can be effectively used.

The above and other objects and features of the present invention will be more apparent from the following description taken in conjunction with the accompanying drawings.

DESCRIPTION OF THE PREFERRED EMBODIMENTS

Figure 1:
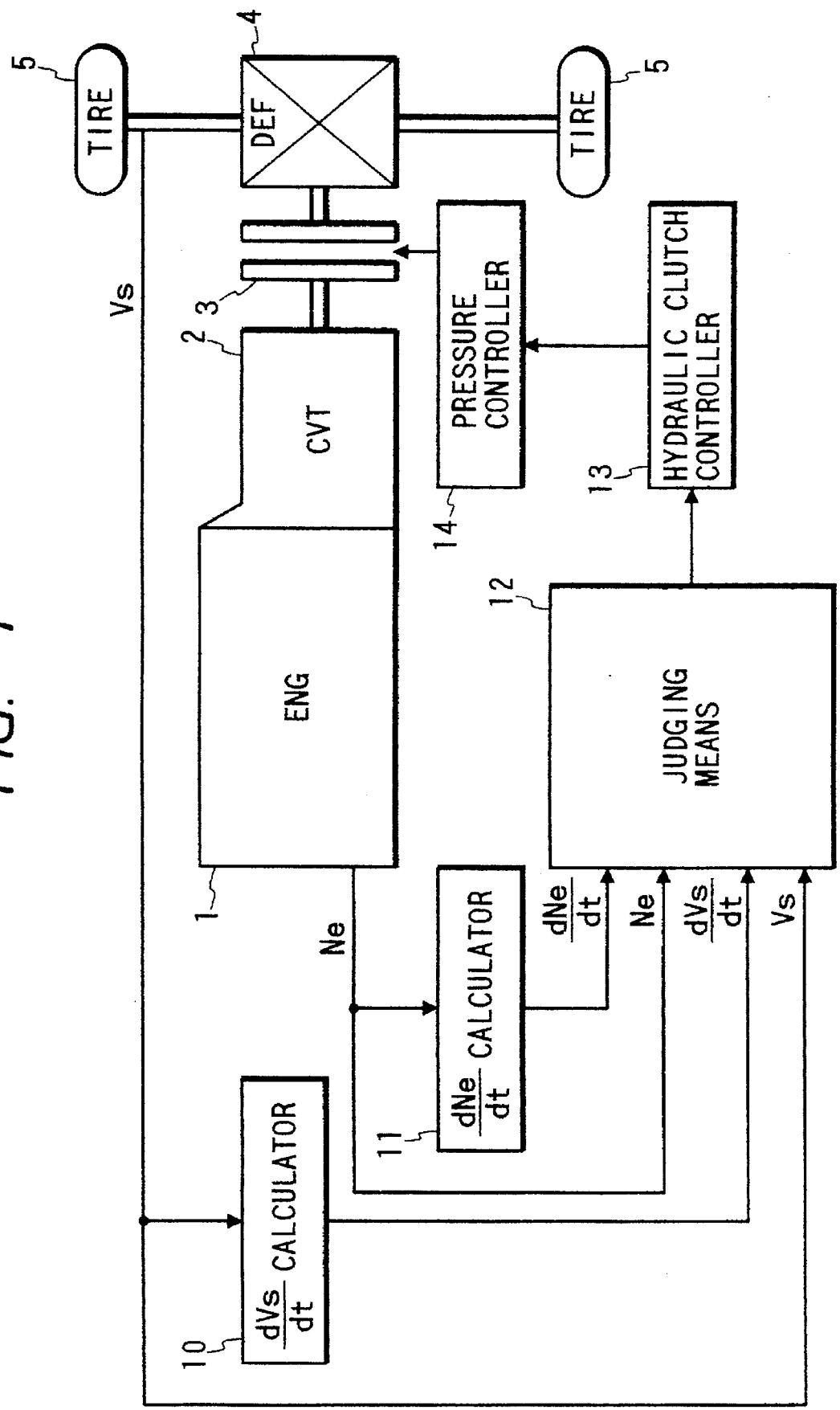
FIG. 1 is a functional block diagram of the clutch control device of a vehicle equipped with an automatic transmission according to the present invention.

Now referring to the drawings, an explanation will be given of an embodiment of the present invention.

FIG. 1 is a functional block diagram of the clutch control device of a vehicle equipped with an automatic transmission. As seen from the figure, the rotary driving of an engine 1 is transmitted to a tire 5 through a continuously variable transmission (CVT) 2 of belt driving type, a hydraulic clutch 3 and differential 4. The vehicle speed Vs detected by a vehicle speed sensor (not shown) is sent to a calculator 10 for calculating a vehicle speed changing rate (dVs/dt). The engine rotational speed Ne detected by an engine rotation sensor (not shown) is sent to a calculator 11 for calculating the changing rate (dNe/dt) of an engine rotational speed.

Further, the engine rotational speed Ne, vehicle speed Vs, vehicle speed changing rate (dVs/dt) calculated by the calculator 10 and engine rotational speed changing rate (dNe/dt) calculated by the calculator 11 are sent to a judging means 12 for judging shift from the direct coupling state of a clutch to its semi-coupling state. The control amount of hydraulic clutch is decided by means for hydraulic clutch controller 13 in accordance with the clutch state decided by the judging means 12. The hydraulic pressure corresponding to the control amount decided by the hydraulic pressure clutch controller is supplied to the hydraulic clutch 3 via a hydraulic pressure control device 14.

Figure 2:
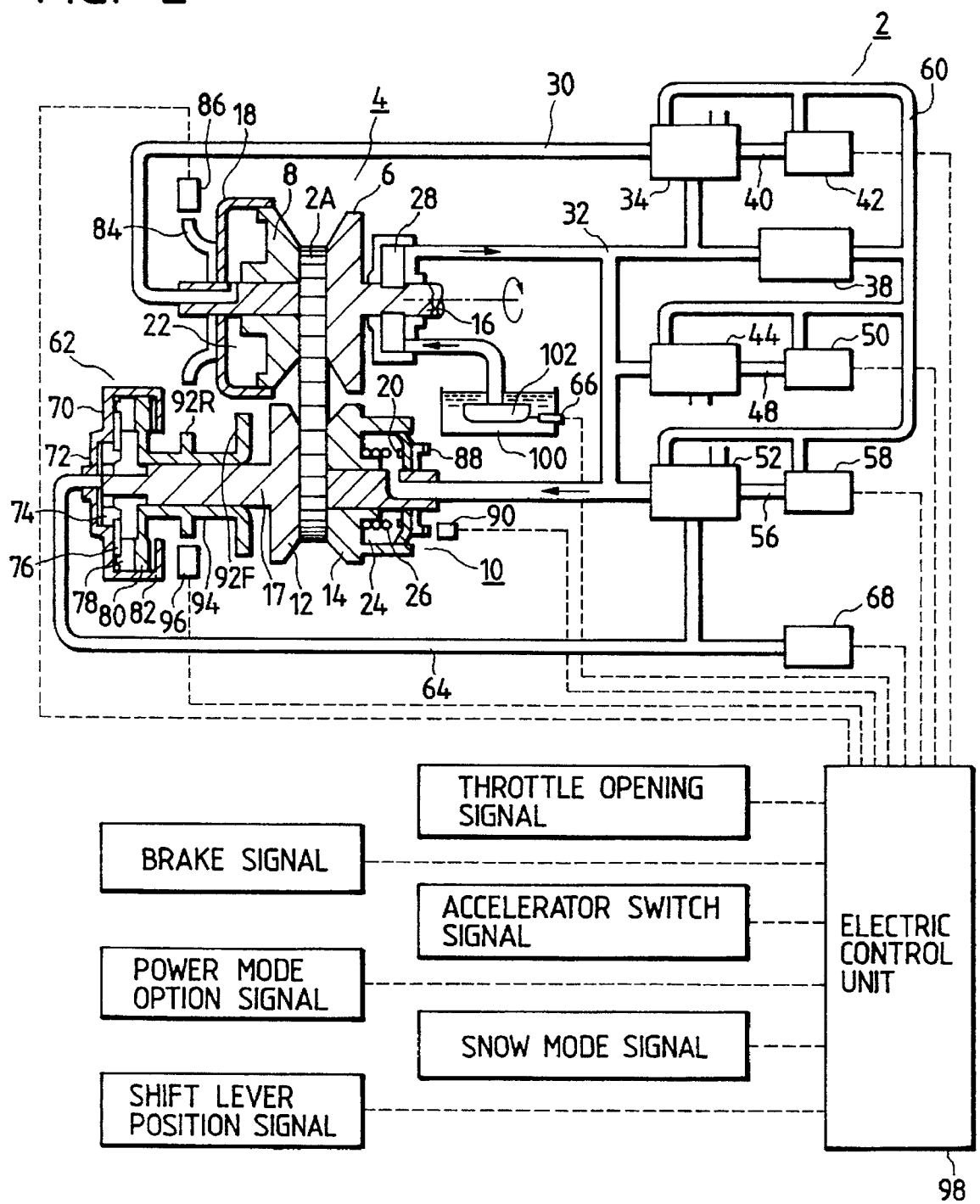
FIG. 2 is a view showing a system structure of the clutch control device according to the present invention.

FIG. 2 is a schematic view showing an automatic transmission and a hydraulic pressure circuit. In the figure, reference numeral 2 denotes a belt-driving type of CVT; 2A, a belt; 4, a driving side pulley; 6, a driving side fixed pulley member; 8, a driving side movable member; 12, a driven side fixed pulley member; and 14, a driven side movable pulley.

As seen from the figure, the driving side pulley 4 includes the driving side fixed pulley member 6 fixed at a rotary shaft 16 that is an input shaft and the driving side movable pulley member 8 that is movably disposed in the axial direction of the rotary shaft 16 and non-rotatable with respect to the shaft 16. Likewise, the driven side pulley 10 also includes a rotary shaft 17 that is an output shaft, the driven side fixed pulley 12 and driven side movable pulley member 14.

A first housing 18 and a second housing 20 are attached to the driving side movable pulley member 8 and the driven side movable pulley member 14, respectively so that a first hydraulic chamber 22 and a second hydraulic chamber 24 are formed. The hydraulic pressure receiving area of the driving side movable side pulley member 8 in the first hydraulic chamber 22 is set to be larger than that of the driven side movable pulley member 14. In this manner, controlling the hydraulic pressure acting on the first hydraulic chamber 22 changes the belt ratio which is a transmission ratio.

Within the second hydraulic pressure chamber 24, energizing means 26 made of spring or the like is provided which energizes the pulley member 14 in the direction of decreasing the width of the groove between the fixed pulley member 12 and the movable pulley member 14 on the driven side. The energizing means 26, when the hydraulic pressure is low, e.g. at the time of engine start, provides a large transmission ratio on the full low and holds the holding force of the belt 2A to prevent slippage.

At the one end of the rotary shaft 16, an oil pump 28 is provided which sucks the oil circulated into an oil pan 100 by means of a strainer 102 and supplies it to a second oil passage 32. The second oil passage 32 is communicated with the second hydraulic chamber 24, and also with the first hydraulic chamber 22 through a primary pressure control valve 34 and the first oil passage 30. The primary pressure control valve 34 is controlled by a first three-way electromagnetic valve 42 through a third oil passage 40 and serves as a transmission control valve for controlling the primary pressure that is a sheave pressure of the input shaft.

The second oil passage 32 which is controlled by a third three-way electromagnetic valve 58 through a fourth oil passage 56 is communicated with a fifth oil passage 64 through a clutch pressure control valve 52.

The line pressure which is hydraulic pressure of the second oil passage 32 is regulated to e.g., 6–25 Kgf/cm² by a line pressure control valve 44 that is controlled by a second three-way electromagnetic valve 50 through a sixth oil passage 48.

A seventh oil passage 60 is regulated to predetermined control pressure (e.g., 4.2 Kgf/cm²) by a regulating valve 38 reducing the line pressure. The seventh oil passage 60 is guided to each of the control valves 34, 44 and 52 and each of the electromagnetic valves 42, 50 and 58.

The fifth oil passage 64 is communicated with a clutch hydraulic chamber 72. The clutch pressure which is the hydraulic pressure on the fifth oil passage 64 is detected by a pressure sensor 68 connected to the fifth oil passage 64. The pressure sensor 68 can directly detect the hydraulic pressure when the clutch pressure in hold and start modes is controlled. Thus, the clutch pressure can be controlled so that the hydraulic pressure is target hydraulic pressure. The clutch pressure which becomes equal to the line pressure in a drive mode also contributes to control of the line pressure.

A hydraulic clutch 62 that is a starting clutch includes an input side casing 70 attached to the rotary shaft 17, a clutch hydraulic chamber 72 provided in the casing, a piston 74 pushed by the hydraulic pressure of the clutch hydraulic chamber, a ring-shaped spring 76 which serves to energize the piston in a pulling-back direction, a first pressure plate 78 provided to be movable back and forth by the pushing force of the piston 74 and the energizing force of the ring-shaped spring 76, and a second pressure plate 82 fixed to the casing 70.

In operation, when the clutch pressure acted on the clutch hydraulic chamber 72 is increased, the piston 74 pushes the first pressure plate 78 and second pressure plate 82 against a friction plate 80 so that the hydraulic clutch 62 falls into the direct coupling state. On the other hand, when the clutch pressure is decreased, the piston 74 is pulled back by the energizing force of the ring-shaped spring 76 so that the first pressure plate 78 and second pressure plate 82 are separated from the friction plate 80, thus placing the clutch 62 into the uncoupling clutch state. Such connection or disconnection of the hydraulic clutch 62 intermits the driving force produced from the CVT 2.

Outside the first housing 18, an input shaft rotation detecting gear 84 is provided, and in the neighborhood of its outer periphery, a first rotation detector 86 on the input shaft side is provided. Outside the second housing 20, an output shaft rotation detecting gear 88 is provided, and in the neighborhood of its outer periphery, a second rotation detector 90 on the output shaft side is provided. In this embodiment, the input shaft rotational speed N1 which is equal to the engine rotational speed is detected by the first rotational detector 86, and the output shaft rotational speed N2 is detected by the second rotation detector 90. Using N1 and N2, a transmission ratio Rc=N1/N2 can be calculated.

The hydraulic clutch 62 is also provided with an output transmission gear 92 consisting of a gear 92F for forward movement and gear 92R for rearward movement. In the neighborhood of the outer periphery of the output transmission gear 92, a third rotation detector 96 is provided which serves to detect the rotational speed of a final output shaft 94. Since the final output shaft 94 is connected to a deceleration gear, a differential mechanism, a driving shaft and driving wheel, the vehicle speed can be calculated from N3 detected by the third rotation detector 96. Using the second rotation detector 90 and third rotation detector 96, the difference between the input and output rotational speeds |N2–N3|, i.e. amount of clutch slippage can be calculated.

An electric control unit (ECU) 98 is provided which performs reception/control of detected signals from the pressure sensor 68, first to third detectors 86, 90 and 96 and a temperature sensor 66 which detects the oil temperature of the oil pan 100, and further several kinds of signals inclusive of a throttle opening signal, accelerator switch signal, braking signal, power mode option signal, snow mode signal, shift lever position signal, etc. The electronic control unit 98 determines several kinds of control modes by these input signals for detecting the driving state, and operates the three-way electromagnetic valves 50, 42 and 58 in order to control the line pressure, transmission ratio and clutch intermittent state, respectively.

The input signals received by the electronic control unit 98 have the following functions:

(1) The detection signal of the shift lever position is used to control the line pressure required for each shift range, transmission ratio and clutch in response to range signals representative of the shift lever position such as P, R, N, D and L, (2) The detected signal of the throttle opening is used to detect the engine torque from the data previously inputted into the program and determine the target transmission ratio or target engine rotational speed.

(3) The accelerator switch signal is used to detect the will of a driver from the depressing state of an accelerator pedal and determine the control method during running or starting.

(4) The braking signal is used to detect the presence or absence of the depressing operation of the braking pedal and determine the control method of disconnection of the clutch.

(5) The power mode option signal is Used as an option for causing the vehicle to have a sporty performance or an economy performance as an option.

(6) The snow mode signal is used for a driver to select the control mode matching the condition of a road surface in the case of a snowy road or slippery road surface.

An explanation will be given for the operation of the above device.

The oil pump 28 located on the rotary shaft 16 operates in accordance with the drive of the rotary shaft 16 to suck oil in the oil pan 100 through the strainer 102. The line pressure that is the pumping pressure is controlled by the line control valve 44. Specifically, the line pressure becomes low when the amount of leakage from the line control valve 44, i.e., the amount of relief is great, and it becomes high when the amount of leakage is little. The operation of the line control valve 44 is controlled by the second three-way electromagnetic valve 50 that is controlled in a duty factor at a constant frequency by the electronic control unit 98. The duty factor of 0% means the state where the second three-way electromagnetic valve does not operate entirely to provide the output hydraulic pressure of zero which results from communication of the output side with atmospheric pressure. On the other hand, the duty factor of 100% means the state where the second three-way electromagnetic valve 50 operates to provide the same maximum output hydraulic pressure as the control pressure.

The primary pressure for transmission control is controlled by the primary pressure control valve 34 that is, like the line pressure control valve 44, also controlled by the first three-way electromagnetic valve 42. The primary pressure control valve 34 guides the hydraulic pressure of the first hydraulic chamber 22 to the side of the line pressure through the first oil path 30 so that the transmission ratio is shifted to the side of overdrive, or otherwise it is guided to the atmospheric pressure side so that the transmission ratio is shifted to the full low side.

Likewise, the clutch pressure control valve 52 that serves to control the clutch pressure is controlled by the third three-way electromagnetic valve 58. In order to provide the maximum clutch pressure, it is communicated with the side of line pressure side. In order to provide the minimum clutch pressure, it is communicated with the atmospheric pressure side. In other words, the clutch pressure control valve 52 communicates the hydraulic pressure of the clutch hydraulic chamber 72 with the line pressure side or atmospheric pressure side through the fifth oil path 64 so that the clutch pressure ranges from the maximum line pressure to the minimum atmospheric pressure (hydraulic pressure=zero).

The above clutch control includes basic four modes, namely, neutral mode, hold mode, start mode, and drive mode.

(1) Neutral mode:

To completely disconnect the clutch at the shift lever position of N or P. In this mode, the clutch pressure is a minimum value.

(2) Hold mode:

To disconnect the engine torque to reserve starting of a vehicle or to decelerate the vehicle during driving, in case the accelerator pedal is not depressed at the shift lever position of D or L, R. In this mode, the clutch pressure is set for a low value enough to make contact of the clutch plate. Creep control is included in this mode.

(3) Start mode:

To start from substantial stopping state (normal start), or to re-connect the clutch during driving (special start). In this mode, the clutch pressure is set at the suitable value corresponding to the engine generating torque (clutch input torque) preventing the engine from over-rotating and causing the engine to be smoothly operated.

(4) Drive mode:

The running state is completed so that the clutch is directly coupled. The clutch pressure is set at a value causing the engine torque to be sufficiently transmitted.

Figure 3:
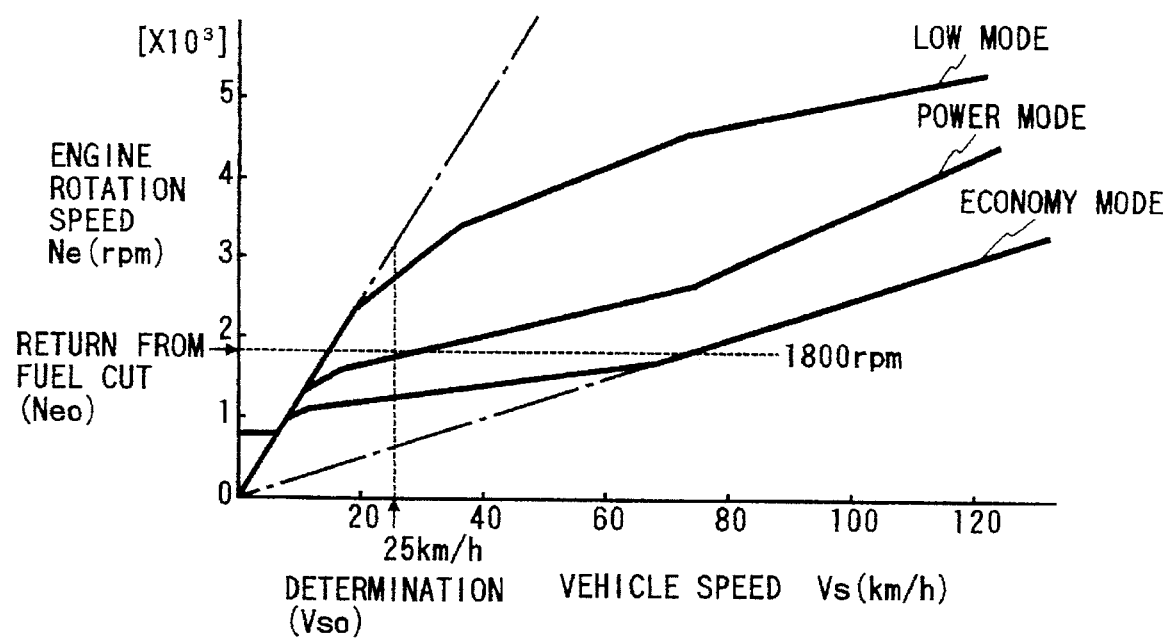
FIG. 3 is a graph showing the relation between Vs and Ne when an accelerator is completely closed in a transmission mode.

FIG. 3 is a graph showing the relation between a vehicle speed Vs and an engine rotational speed Ne when a throttle (accelerator) is completely closed in a transmission mode.

The transmission mode includes three modes where a shift lever position is in a range of D and a power mode option signal is OFF (economy mode); the shift lever position is in a range of D and the power mode option signal is ON (power mode); and the shift lever position is in a range of L (low mode).

During the coast down in each transmission mode, the transmission ratio is controlled along the solid line in FIG.

3. In the low mode, since Vs≦Vso (vehicle speed to determine from direct coupling to semi-coupling) before return from fuel cut, the shock due to the return from fuel cut will be reduced. In the power mode, since the clutch is in the clutch direct coupling state at the time of return, shock due to the return from fuel cut is large. In the economy mode also, the clutch is in the direct coupling state at the time of return from fuel cut. But, since the transmission ratio is OD (overdrive), torque change at the time of return from fuel cut is small.

Figure 4:
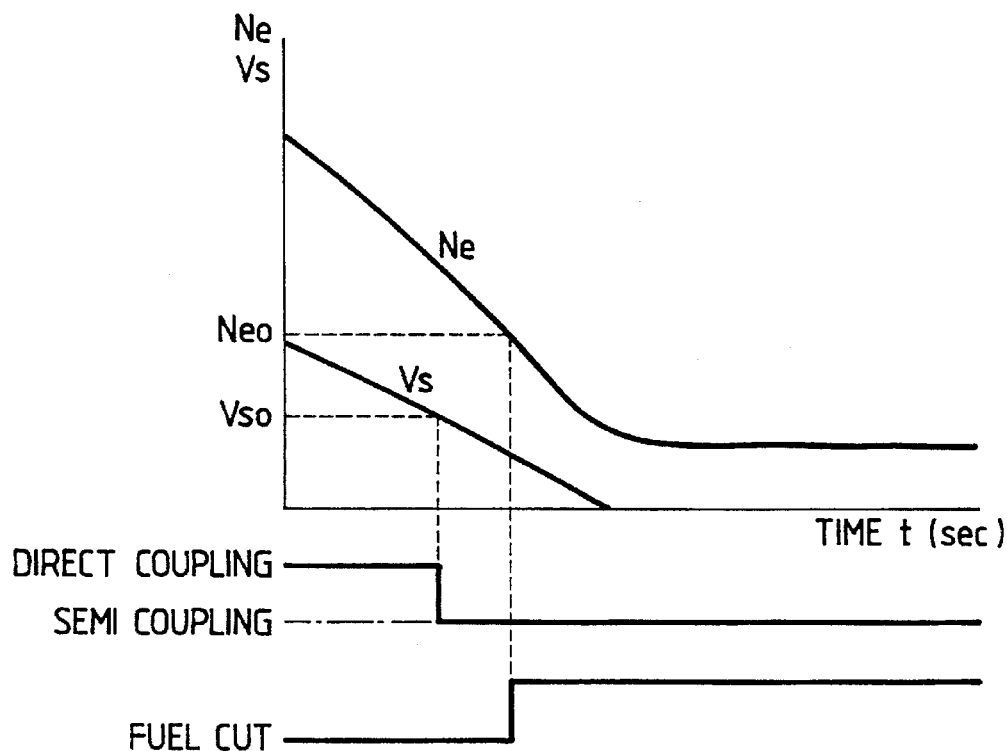
FIGS. 4 and 5 are timing charts showing timings when a direct coupling clutch state is changed into a semi-coupling state during coast-down or braking and return from fuel cut occurs.
Figure 5:
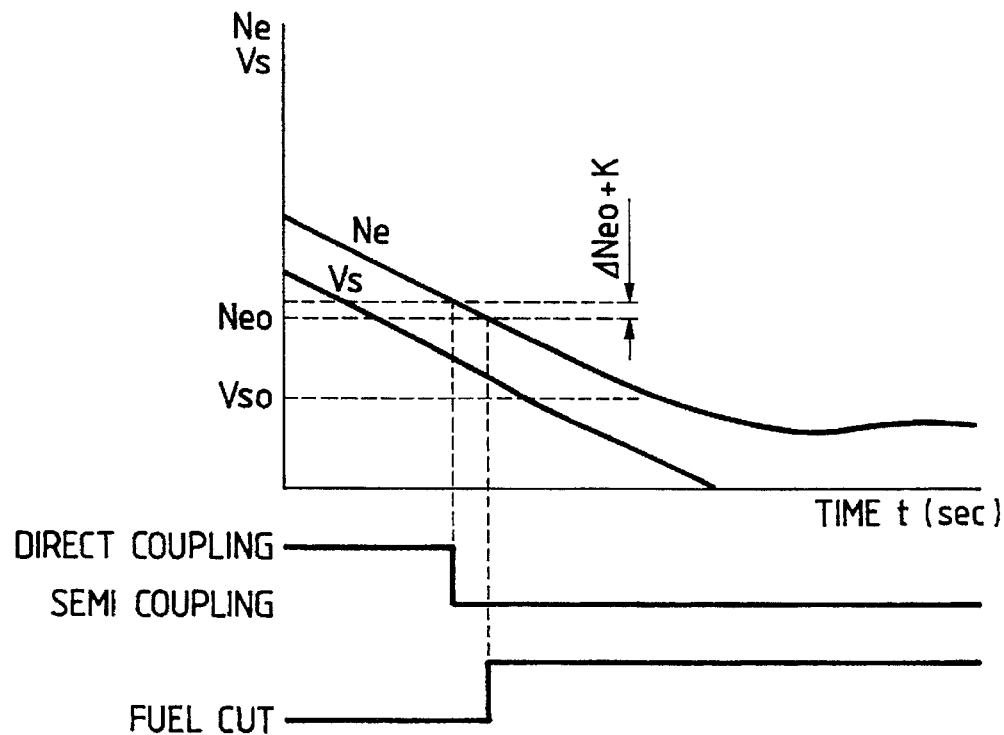

FIGS. 4 and 5 are timing charts showing the timings of shift from the clutch direct coupling state to the semi-coupling state during coast-down or braking, and of return from fuel cut.

FIG. 4 shows the case where Vs≦Vso has been attained before Ne≦Neo. In this case, since the shift from the direct coupling state to the semi-coupling state is attained before the return from fuel cut, shock due to torque change at the time of return from fuel cut is reduced.

Likewise, FIG. 5 shows the case where Ne≦Neo has been attained before Vs≦Vso. In this case, when Ne≦Neo+ΔNeo+K (K: positive predetermined value) holds before Ne≦Neo, the shift from the direct coupling state to the semi-coupling state is made, thereby reducing shock due to torque changes at the time of return from fuel cut.

Figure 6:
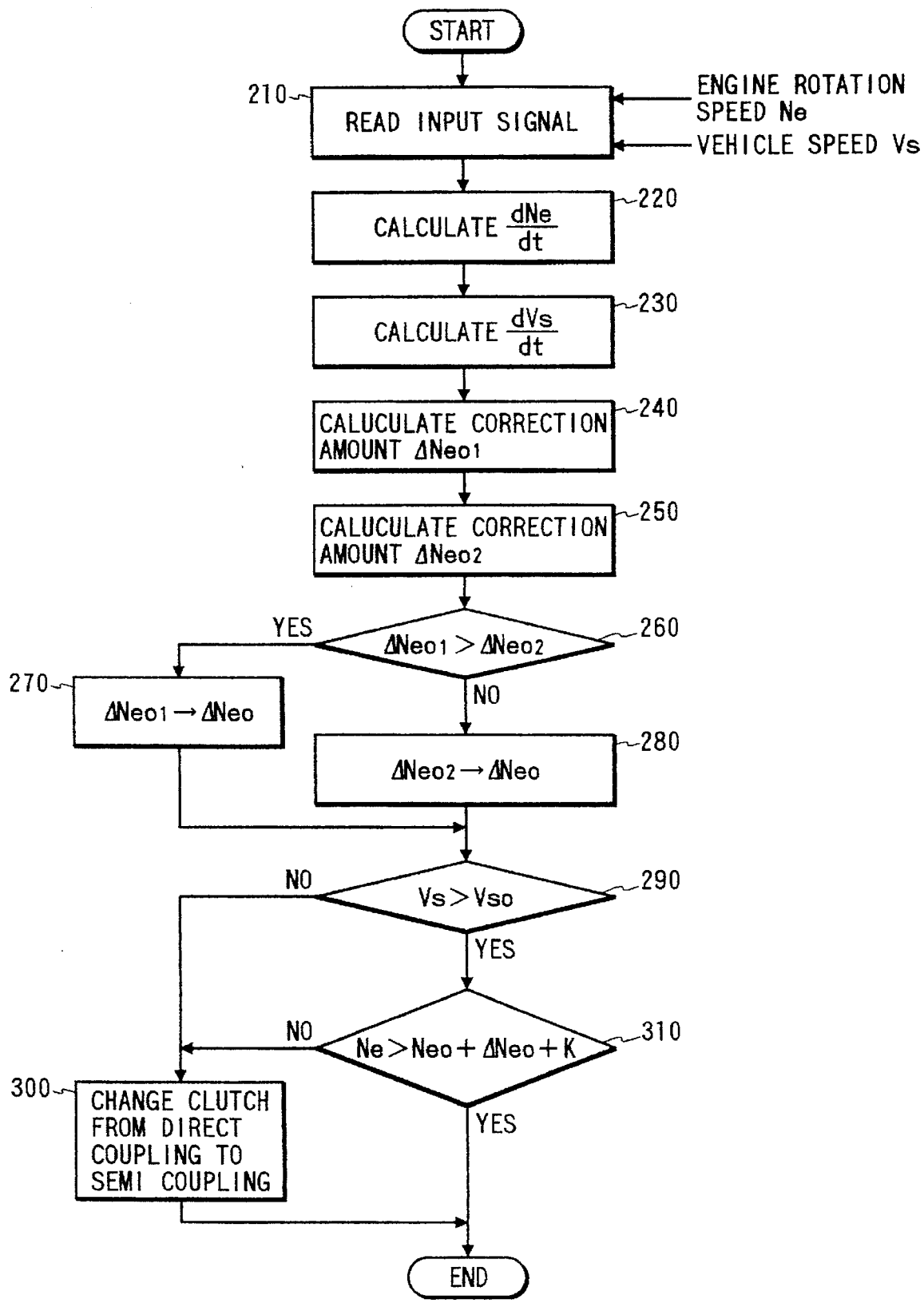
FIG. 6 is a flowchart showing the clutch control routine for a vehicle equipped with an automatic transmission.

FIG. 6 is a flowchart showing the clutch control routine for a vehicle equipped with an automatic transmission.

In the clutch control routine, signals corresponding to an engine rotational speed Ne and a vehicle speed Vs are inputted (Step 210). On the basis of the engine rotational speed Ne and the vehicle speed Vs, an engine rotational speed changing rate dNe/dt (Step 220) and a vehicle speed changing rate dVs/dt (Step 230) are calculated.

Figure 7:
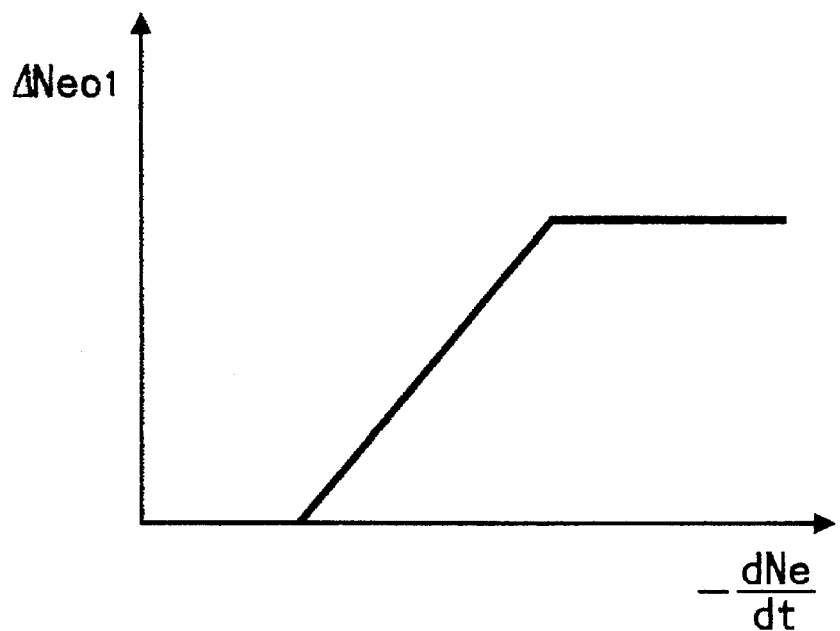
FIGS. 7 and 8 are graphs for calculating ΔNeo1 from dNe/dt.

On the basis of the engine rotational speed changing rate dNe/dt, along a prescribed map (e.g. FIG. 7), the amount of correction ΔNeo1 of the engine rotational speed at the return from fuel cut is calculated (Step 240).

Figure 8:
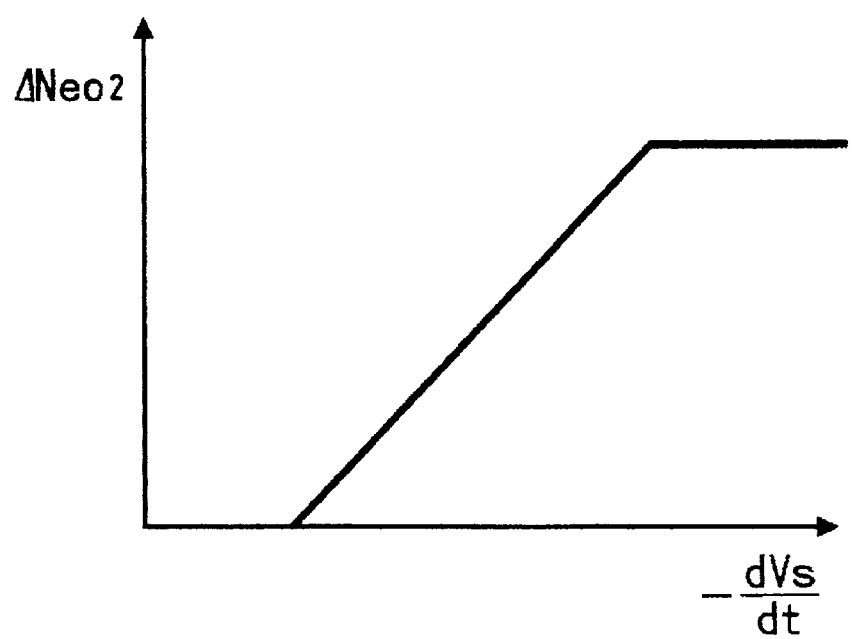

On the basis of the vehicle speed changing rate dVs/dt, along a prescribed map (e.g. FIG. 8), the amount of correction ΔNeo2 of the engine rotational speed at the return from fuel cut is calculated (Step 250).

These calculated amounts ΔNeo1 and ΔNeo2 are compared with each other (Step 260), and the larger one is adopted as the amount of correction ΔNeo of the engine rotational speed at the return from fuel cut (Step 270, 280).

The reason why the amounts of correction ΔNeo1 and ΔNeo2 corresponding to the absolute values of dNe/dt and dVs/dt are introduced is that the clutch is kept in the direct coupling state until the vehicle speed Vs becomes a low value during coast-down, and it is swiftly changed into a semi-coupling state at the abrupt braking.

The vehicle speed Vs and the vehicle speed Vso of deciding the shift from the direct coupling to the semi-coupling are compared (Step 290), and if Vs≦Vso the clutch is changed from direct coupling state to the semi-coupling state (Step 300).

The engine rotational speed Ne and the engine rotational speed Neo+ΔNeo+K are compared with each other (Step 310), and if Ne≦Neo+ΔNeo+K, the clutch is changed from the direct coupling state into the semi-coupling state (Step 300).

In the above embodiment (FIG. 1), the clutch control device was constructed in the order of engine→CVT→starting clutch. But, it may be constructed in the order of engine→starting clutch→CVT. It may be also applied to an automatic transmission with multi-step transmission as well as CVT. Further, the starting clutch was explained as a wet type hydraulic clutch, but it may be an lock-up clutch or a electromagnetic clutch as long as it can automatically control clutch transmission torque.

What is claimed is:

1. A clutch control method for a vehicle with an automatic transmission having a clutch for connecting and disconnecting power transmission of the automatic transmission, comprising steps of:

restarting a fuel jet from a fuel cut state during deceleration; and before said restarting step, changing the clutch from a direct coupling state into a semi-coupling state.

2. A clutch control method for a vehicle with an automatic transmission having a clutch for connecting and disconnecting power transmission of the automatic transmission, comprising a step of:

changing the clutch from a direct coupling state into a semi-coupling state before a fuel jet is restarted from a fuel cut state during deceleration, said clutch control method further comprising steps of:

inputting signals representative of an engine rotation speed (Ne) and a vehicle speed (Vs);

calculating an engine rotation speed changing rate (dNe/dt) a vehicle speed changing rate (dVs/dt) on the basis of the engine rotation speed and the vehicle speed;

obtaining a first correction value (ΔNeo1) of the engine rotation speed at the restart of fuel on the basis of the engine rotation speed changing rate (dNe/dt);

obtaining a second correction value (ΔNeo2) of the engine rotation speed at the restart of fuel on the basis of the vehicle speed changing rate (dVs/dt);

comparing the first correction value (ΔNeo1) with the second correction value (ΔNeo2) and adopting the larger one as a third correction value (ΔNeo) of the engine rotation speed at the restart of the fuel;

correcting a predetermined engine rotation speed (Neo) at the restart of the fuel in accordance with the third correction value (ΔNeo); and changing the clutch from a direct coupling state into a semi-coupling state if the engine rotation speed (Ne) is smaller than the corrected engine rotation speed at the restart of the fuel.

3. A clutch control method as claimed in claim 2, wherein said first correction value (ΔNeo1) is obtained by using a prescribed map representing a relation of the engine rotational speed changing rate (dNe/dt) and the first correction value (ΔNeo1), while said second correction value (ΔNeo2) is obtained by using a prescribed map representing a relation of the vehicle speed changing rate (dVs/dt) and the second correction value (ΔNeo2).

4. A clutch control device for a vehicle with an automatic transmission having a clutch for connecting and disconnecting power transmission of the automatic transmission, comprising:

a clutch state determination means for comparing, in a fuel cut state during deceleration, one of an actual vehicle speed (Vs) with a target vehicle speed (Vso), and an actual engine rotational speed (Ne) with an engine rotational speed (Neo) at a return from the fuel cut state; and clutch control means for changing the clutch from a direct coupling state into a semi-coupling state if the actual vehicle speed (Vs) is less than or equal to the target vehicle speed (Vso), or if the actual engine rotational speed (Ne) is less than or equal to the engine rotational speed (Neo) at the return from the fuel cut state plus a first positive predetermined value.

5. A clutch control device as claimed in claim 4, wherein if the actual vehicle speed (Vs) is less than or equal to the target vehicle speed (Vso), or if the actual engine rotational speed (Ne) is less than or equal to the engine rotational speed (Neo) at the return from the fuel cut state plus a correction coefficient (ΔNeo) and a second positive predetermined value, then the clutch is changed from the direct coupling state into the semi-coupling state, and the correction coefficient (ΔNeo) where the clutch is changed from the direct coupling state into the semi-coupling state is changed by one of a changing rate (dVs/dt) of the actual vehicle speed (Vs) and a changing rate (dNe/dt) of the actual engine rotational speed (Ne).

6. A clutch control method for a vehicle with an automatic transmission having a clutch for connecting and disconnecting power transmission of the automatic transmission, comprising steps of:

comparing, in a fuel cut state during deceleration, one of an actual vehicle speed with a target vehicle speed, and an actual engine rotational speed with an engine rotational speed at a return from the fuel cut state; and changing the clutch from a direct coupling state into a semi-coupling state when the actual vehicle speed is less than or equal to the target vehicle speed, or when the actual engine rotational speed is less than or equal to the engine rotational speed at the return from the fuel cut state plus a positive predetermined value.

* * * * *